(12) United States Patent
Sharma et al.

(10) Patent No.: US 8,897,838 B2
(45) Date of Patent: Nov. 25, 2014

(54) COMMUNICATION SYSTEM

(75) Inventors: Vivek Sharma, Leatherhead (GB); Milena Filipovic, Leatherhead (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/138,283

(22) PCT Filed: Feb. 15, 2010

(86) PCT No.: PCT/JP2010/052575
§ 371 (c)(1),
(2), (4) Date: Jul. 27, 2011

(87) PCT Pub. No.: WO2010/095727
PCT Pub. Date: Aug. 26, 2010

(65) Prior Publication Data
US 2011/0281575 A1 Nov. 17, 2011

(30) Foreign Application Priority Data

Feb. 17, 2009 (GB) .................................... 0902628.7

(51) Int. Cl.
| | | |
|---|---|---|
| H04M 1/00 | (2006.01) | |
| H04B 1/38 | (2006.01) | |
| H04W 24/02 | (2009.01) | |
| H04W 84/04 | (2009.01) | |
| H04W 88/08 | (2009.01) | |

(52) U.S. Cl.
CPC ............ *H04W 24/02* (2013.01); *H04W 84/042* (2013.01); *H04W 84/045* (2013.01); *H04W 88/08* (2013.01)
USPC ........... 455/561; 371/328; 371/329; 371/312; 371/338; 371/341

(58) Field of Classification Search
USPC .......................... 370/328, 329, 312, 338, 341
See application file for complete search history.

(56) References Cited

U.S. PATENT DOCUMENTS

| | | |
|---|---|---|
| 6,701,148 B1 | 3/2004 | Wilson et al. |
| 7,734,312 B2 | 6/2010 | Hosono et al. |
| 7,822,044 B2 | 10/2010 | Lee et al. |

(Continued)

FOREIGN PATENT DOCUMENTS

| | | |
|---|---|---|
| CN | 101052193 A | 10/2007 |
| EP | 1 351 424 A2 | 10/2003 |

(Continued)

OTHER PUBLICATIONS

3GPP TS 22.011, Technical Specification Group Services and System Aspects; Service accessibility (Release 9), V9.0.0 (Dec. 2008).
Korean Office Action dated Nov. 21, 2012, with English translation.
Frank Lesher, et al., NGMN Recommendation on SON and O&M Requirements, A Requirement Specification by NGMN Alliance, pp. 38-40, (pp. 1-39 previously submitted).

(Continued)

*Primary Examiner* — Kwasi Karikari
(74) *Attorney, Agent, or Firm* — McGinn IP Law Group, PLLC

(57) ABSTRACT

A Home NodeB (HNB) is provided that can be triggered to dynamically change its operating radio parameters, such as its transmission frequency or its primary scrambling code without having to be rebooted and which communicates the changed operating parameters to the mobile user devices served thereby. In this way a seamless changeover of the operating parameters can be provided that is transparent to users. The HNB may be triggered to change operating parameters by the mobile operating network or by an internal procedure.

35 Claims, 5 Drawing Sheets

(56) References Cited

U.S. PATENT DOCUMENTS

| | | |
|---|---|---|
| 2002/0172188 A1 | 11/2002 | Wunsch |
| 2005/0197133 A1 | 9/2005 | Hong et al. |
| 2006/0094408 A1* | 5/2006 | Hu et al. .................... 455/414.1 |
| 2007/0087752 A1* | 4/2007 | Voyer et al. .................... 455/436 |
| 2007/0232313 A1 | 10/2007 | Hosono et al. |
| 2010/0008323 A1* | 1/2010 | Deshpande et al. .......... 370/331 |
| 2010/0103850 A1* | 4/2010 | Gossain et al. ............... 370/312 |

FOREIGN PATENT DOCUMENTS

| | | |
|---|---|---|
| EP | 1 971 174 A2 | 9/2008 |
| GB | 2 424 795 A | 10/2006 |
| JP | 2007-281682 A | 10/2007 |
| KR | 2003-0079632 A | 10/2003 |

OTHER PUBLICATIONS

Japanese Office Action dated Oct. 10, 2012 with partial English translation.
3GPP TS 36.300 V8.7.0, Dec. 2008, p. 19-p. 23, t,q,k, http://www.3gpp.org/ftp/Specs/archive/36_series/36.300/36300-870.zip.
NGMN Recommendation on SON & O&M Requirements a Requirement Specification by NGMN Alliance, Third Generation Partnership Project (3GPP) Draft Meeting Report S5-090009, Dec. 5, 2008, p. 1-p. 39, URL, http://www.3gpp.org/ftp/tsg_sa/WG5_TM/Ad-hoc_meetings/2009-01-RAN3/Docs/S5-0.
3GPP TS 25.402 V3.10.0, Jun. 2002, p. 34-p. 37, t,q,k, http://www.3gpp.org/ftp/Specs/archive/25_series/25.402/25402-3a0.zip.
Chinese Office Action with Chinese Search Report dated Jul. 3, 2013, with partial English translation.

* cited by examiner

COMMUNICATION SYSTEM

TECHNICAL FIELD

The present invention relates to mobile telecommunication networks, particularly but not exclusively networks operating according to the 3GPP standards or equivalents or derivatives thereof. The invention has particular although not exclusive relevance to the operation of a home base station and user equipment (UE) associated with the home base station.

BACKGROUND ART

Under the 3GPP standards, a NodeB (or an eNB in LTE) is the base station via which mobile devices connect to the core network. Recently the 3GPP standards body has adopted an official architecture and started work on a new standard for home base stations (HNB). Where the home base station is operating in accordance with the LTE standard, the HNB is sometimes referred to as a HeNB. A similar architecture will also be applied in the WiMAX network. In this case, the home base station is commonly referred to as a femto cell. For simplicity, the present application will use the term HNB to refer to any such home base station. The HNB will provide radio coverage (3G/4G/WiMAX) within the home and will connect to the core network via a suitable public network (for example via an ADSL link to the Internet) and in the case of the 3GPP standards, via an optional HNB gateway (HNB-GW).

An HNB will operate on the same or on a different frequency to the macro cell(s) within which it is located and on the same or a different frequency to other HNBs operating in its vicinity. Under current proposals, the operating radio parameters (such as its frequency and/or its primary scrambling code (PSC)) of the HNB are either acquired from the core network operator when the HNB is powered up or are acquired through a self configuration routine that involves learning the surrounding environment, and the only way that these parameters can be changed is by resetting or rebooting the HNB. It is expected that HNBs will be widely deployed. For example, provision has been given in 3GPP TS 22.011 to address 125 million HNBs within a PLMN (Public Land Mobile Network). The inventors have realized that with such a wide spread deployment, radio conditions around the HNB may change regularly resulting in varying levels of interference.

DISCLOSURE OF INVENTION

The inventors have concluded, therefore, that it would be beneficial if the HNB can change its operating radio parameters after power on, during its normal operational state, based on new radio conditions and communicate its new parameters to the UEs being served by the HNB.

Although for efficiency of understanding for those of skill in the art, the invention will be described in detail in the context of a 3G system, the principles of the invention can be applied to other systems (such as WiMAX) in which mobile devices or User Equipment (UE) communicate with one of several base stations with the corresponding elements of the system changed as required.

According to one aspect, the present invention provides a home base station comprising: transceiver circuitry operable to transmit wireless signals to and to receive wireless signals from a user device in accordance with current operating radio parameters; and a parameter control module operable, in response to a trigger, to obtain new operating radio parameters (such as a new transmission frequency or a new Primary Scrambling Code (PSC) or equivalent) and to reconfigure the transceiver circuitry with the new operating radio parameters. The reconfiguration can be performed dynamically while the home base station is serving one or more mobile telephones and without having to power down or reset the home base station. The new operating parameters may be obtained either by receiving them from the Mobile Network Operator via any node which is higher or at the same level in the hierarchy within the operator network or by determining them following a consideration of the surrounding environment. A communications control module is provided that communicates with the user device to inform the user device of the new operating radio parameters In a preferred embodiment, the communications control module communicates with the user device to inform the user device of the new operating radio parameters prior to the parameter control module reconfiguring the transceiver circuitry. The communications control module may inform user devices operating in a Connected mode of the change but not user devices operating in an Idle mode or it may try to inform all user devices regardless of their operating mode. The communications control module may inform user devices using a dedicated control channel, a broadcast control channel or some other channel such as an MBMS service. The user devices may be informed by updating a Neighbour Cell List, to include the home base station as a neighbour with the new configuration. The communications control module may inform user devices operating in different modes using different control channels. Regardless of the way in which the different user devices are informed of the change, they are preferably given timing information that defines when the reconfiguration will take place.

According to another aspect, the present invention provides a mobile user device comprising: transceiver circuitry for transmitting signals to and for receiving signals from a home base station in accordance with current operating radio parameters of a home base station; and a parameter control module operable to obtain data identifying new operating radio parameters of the home base station and to reconfigure said transceiver circuitry with the new operating radio parameters. Typically the mobile device will receive the new operating radio parameters from the home base station.

The mobile device may have a first mode of operation and a second mode of operation and the communications control module may be arranged to receive the new operating radio parameters over a dedicated control channel when the user device is operating in the first mode of operation and to receive the new operating radio parameters over a broadcast channel when the user device is operating in the second mode of operation. The first mode of operation may be a Connected mode of operation and the second mode of operation may be an Idle mode of operation.

The mobile device may be informed of the change via a broadcast control channel or via a dedicated control channel. The information received by the mobile device preferably includes timing information identifying when the changeover will take place. Between the time that the mobile device is informed of the change and the time of the changeover, the mobile device preferably continues to communicate with the home base station using the current operating parameters.

The present invention also provides a communications control signal for use in reconfiguring operating parameters of a transceiver circuit, the signal including a first portion for signalling a change of frequency or a change in primary scrambling code and a second portion for signalling timing information indicating when the transceiver circuit should be reconfigured.

The invention provides, for all methods disclosed, corresponding computer programs or computer program products for execution on corresponding equipment, the equipment itself (user equipment, nodes or components thereof) and methods of updating the equipment. The computer programs may be provided on a recording medium such as a CD-ROM or the like.

BRIEF DESCRIPTION OF THE DRAWINGS

An embodiment of the invention will now be described, by way of example, with reference to the accompanying drawings in which.

BEST MODE FOR CARRYING OUT THE INVENTION

Overview

Figure 1:
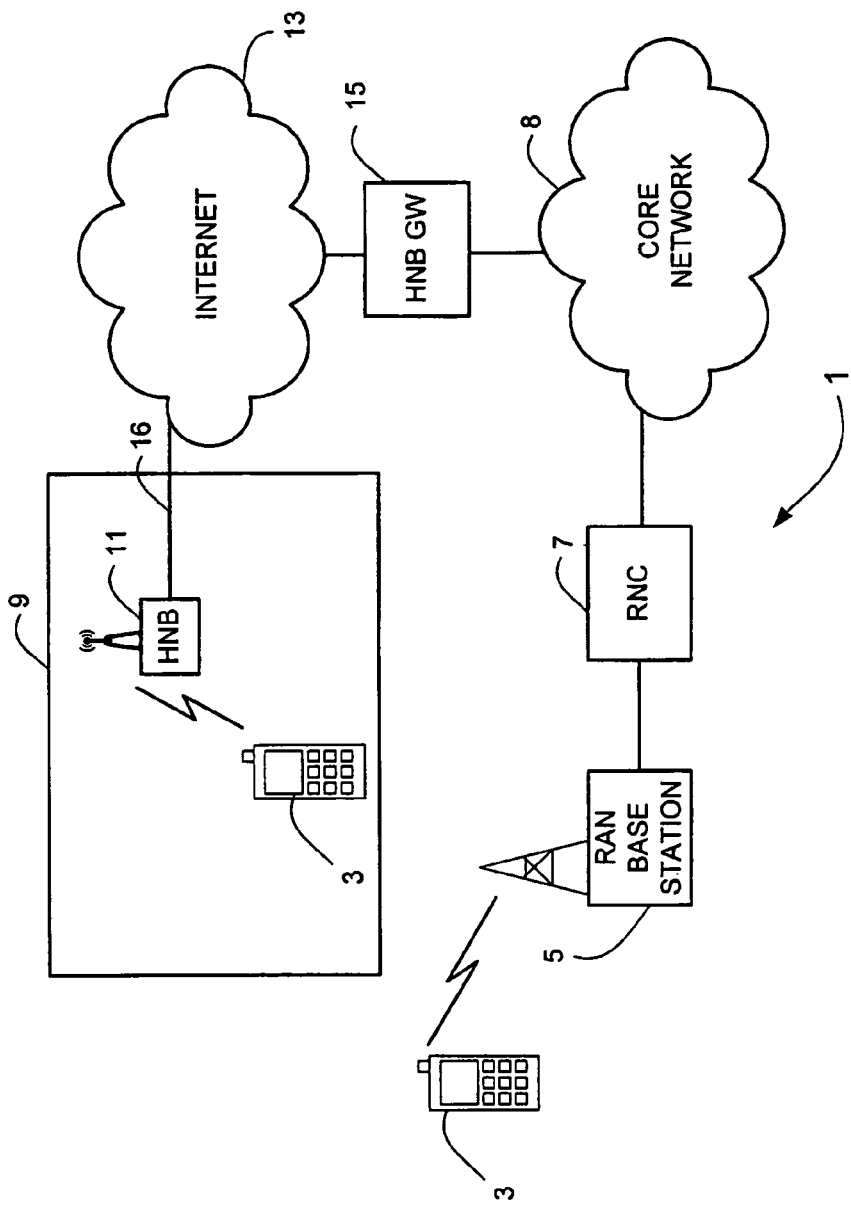
FIG. 1 schematically illustrates a mobile telecommunication system of a type to which the embodiment is applicable.

FIG. 1 schematically illustrates a mobile (cellular) telecommunication system 1 in which a user of a mobile telephone (MT) 3 can communicate with other users (not shown) via a macro cell of a 3G Radio Access Network (RAN) base station 5, a Radio Network Controller 7 and a core telephone network 8 when the user is away from home 9; and which can communicate with other users (not shown) via the cell of a home base station (HNB) 11, a public data network (in this case the Internet 13), a home base station gateway (HNB-GW) 15 and the core telephone network 7 when the user is at home 9. The HNB 11 will typically connect to the HNB-GW 15 via a suitable residential Internet connection such as an ADSL or cable connection 16 and is programmed with the IP address of the HNB-GW 15 so that all uplink communications are transmitted to the HNB-GW 15. The HNB 11 is configured by the mobile telephone network operator (forming part of the core network 8) by sending appropriate control signals to the HNB 11 via the Internet 13. As those skilled in the art will appreciate, the HNB 11 can communicate with a number of different mobile telephones 3.

Mobile Telephone

Figure 2:
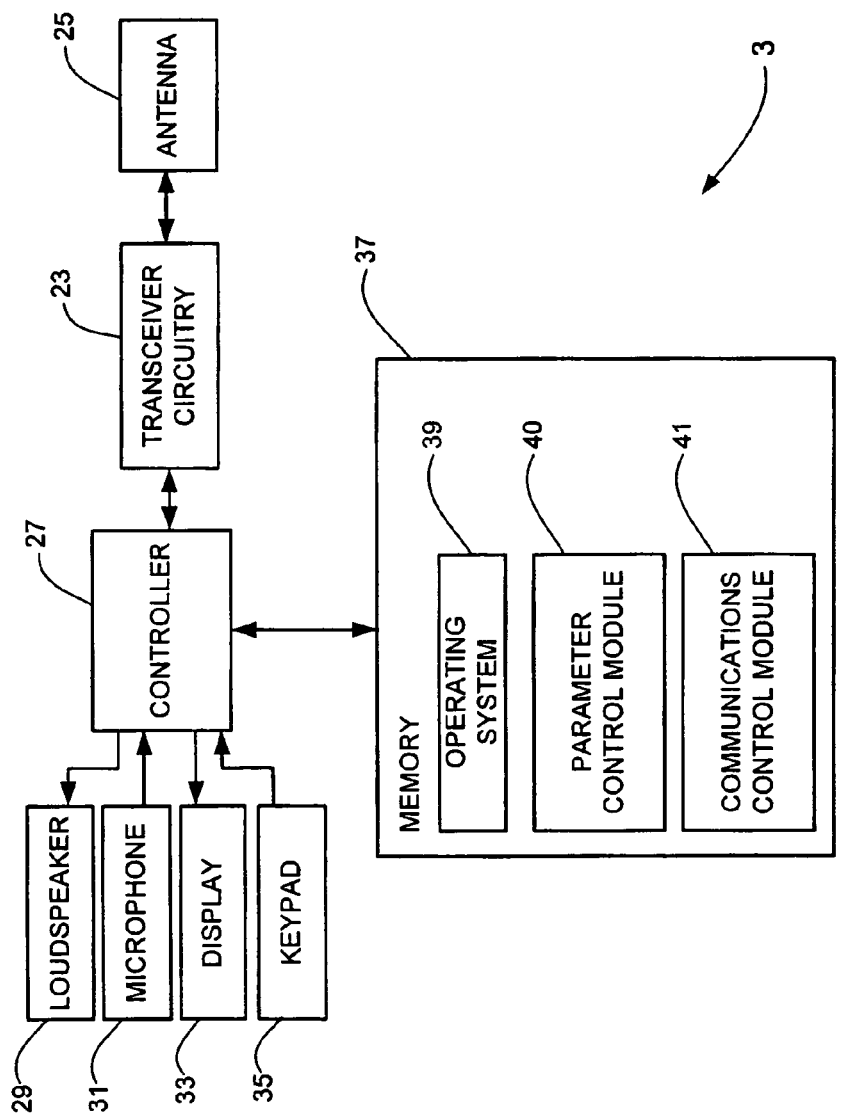
FIG. 2 is a block diagram of a mobile telephone forming part of the system shown in FIG. 1.

FIG. 2 schematically illustrates the main components of the mobile telephone 3 shown in FIG. 1. As shown, the mobile telephone 3 includes transceiver circuitry 23 which is operable to transmit signals to and to receive signals from the RAN base station 5 or the HNB 11 via one or more antennae 25. As shown, the mobile telephone 3 also includes a controller 27 which controls the operation of the mobile telephone 3 and which is connected to the transceiver circuit 23 and to a loudspeaker 29, a microphone 31, a display 33, and a keypad 35. The controller 27 operates in accordance with software instructions stored within memory 37. As shown, these software instructions include, among other things, an operating system 39, a parameter control module 40 and a communications control module 41. In this embodiment, the parameter control module 40 controls parameter values used by the transceiver circuit 23 in its communications with the HNB 11; and the communications control module 41 controls the communications with the HNB 11 and selects the home base station 11 when the mobile telephone 3 is within range of their HNB 11. The selection may be automatic or manually controlled by the user. During initial registration with the HNB 11, the parameter control module 40 will acquire the operating radio parameters for the HNB 11 and will use them to configure the transceiver circuitry 23 for subsequent communications with the HNB 11.

Home Base Station

Figure 3:
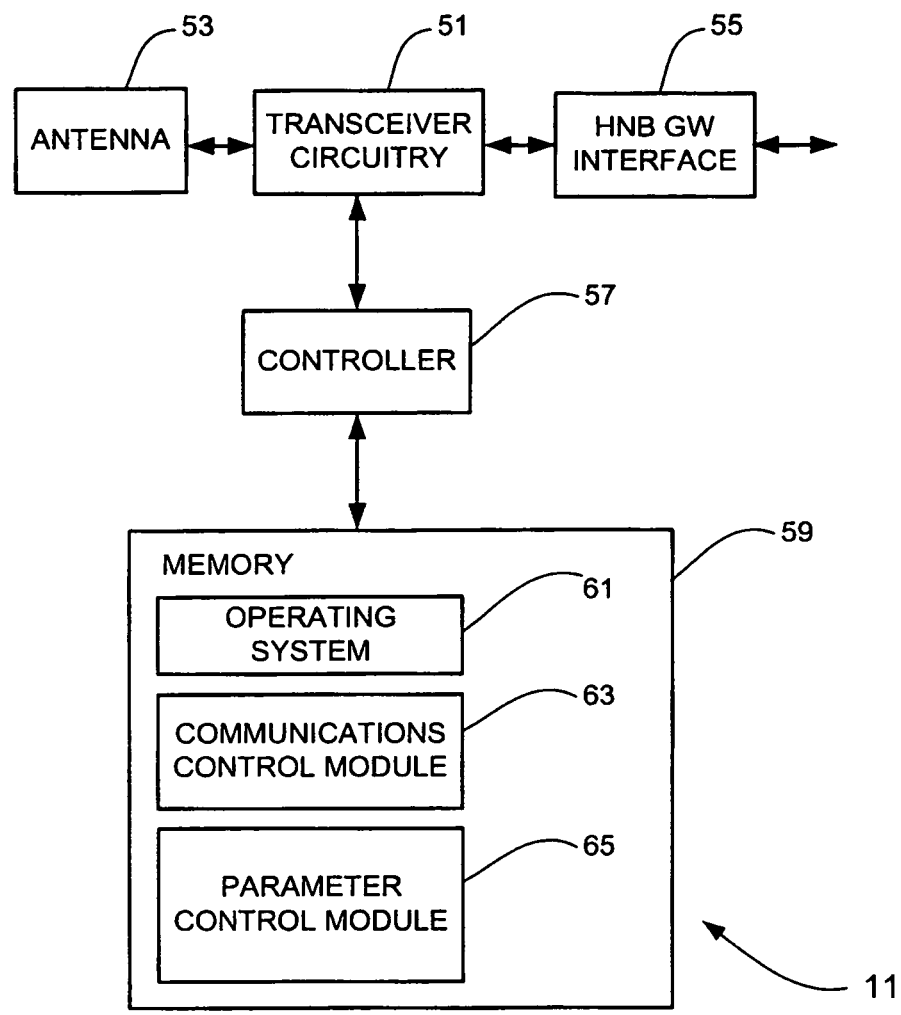
FIG. 3 is a block diagram of a home base station forming part of the system shown in FIG. 1.

FIG. 3 is a block diagram illustrating the main components of the home base station (HNB) 11 shown in FIG. 1. As shown, the HNB 11 includes transceiver circuitry 51 which is operable to transmit signals to, and to receive signals from, the mobile telephone 3 via one or more antennae 53 and which is operable to transmit signals to and to receive signals from the HNB-GW 15 via a HNB-GW interface 55. The operation of the transceiver circuitry 51 is controlled by a controller 57 in accordance with software stored in memory 59. The software includes, among other things, an operating system 61, a communications control module 63 and a parameter control module 65. The communications control module 63 is operable to control communications between the HNB 11 and the mobile telephone 3 and the HNB-GW 15. The parameter control module 65 is operable to receive operating parameters from the mobile operator via the Internet 13 and to configure the transceiver circuitry 51 in accordance with those parameters. As will be described in more detail below, the parameter control module 65 is operable to change the operating parameters of the transceiver circuitry 51. It does this when triggered by a radio resource management (RRM) entity within the mobile operator network or by some internally generated trigger generated, for example, by a mobile network operator policy function. In this embodiment, prior to the reconfiguration, the communications control module 63 informs registered mobile telephones 3 with the changed operating radio parameters.

In the above description, the mobile telephone 3 and the home base station 11 are described for ease of understanding as having a number of discrete modules (such as the communications control and the parameter control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

In operation, the parameter control module 65 is operable, when triggered, to change the operating radio parameters of the HNB 11. The trigger may be supplied by a radio resource management (RRM) entity of the PLMN or by some internal trigger generating mechanism. The trigger may be generated based on a management policy of the mobile operator or based on sensed interference conditions. For example, the mobile operator may implement a policy that at certain times of the day, one group of HNBs 11 will be configured to operate with different operating parameters than those normally used by those HNBs. This may be done, for example, to reduce interference caused to another group of HNBs. Alternatively, the HNB 11 may be programmed to change its operating parameters if it detects interference above a certain threshold.

When the HNB 11 is triggered to change its operating parameters, the parameter control module 65 will obtain the new operating parameters and the communications control module 63 will initiate a procedure that provides an organised transition between the old and new operating parameters. To provide a seamless change over, registered mobile telephones 3 that are in connected modes Cell-DCH and Cell-FACH (ie those actively transmitting or receiving data from the HNB 11) have to be informed of the new operating parameters in advance of the changeover and have to be informed of when the changeover will occur. Mobile telephones 3 that are in the IDLE mode or in the CELL-PCH or URA-PCH connected modes are not transmitting or receiving data at the current time and informing them of the new radio parameters is less important (and indeed can be omitted) for providing users with a seamless transition.

A number of different options for informing registered mobile telephones 3 of the change will now be described.

Option 1—Cell-DCH and Cell-FACH

Figure 4:
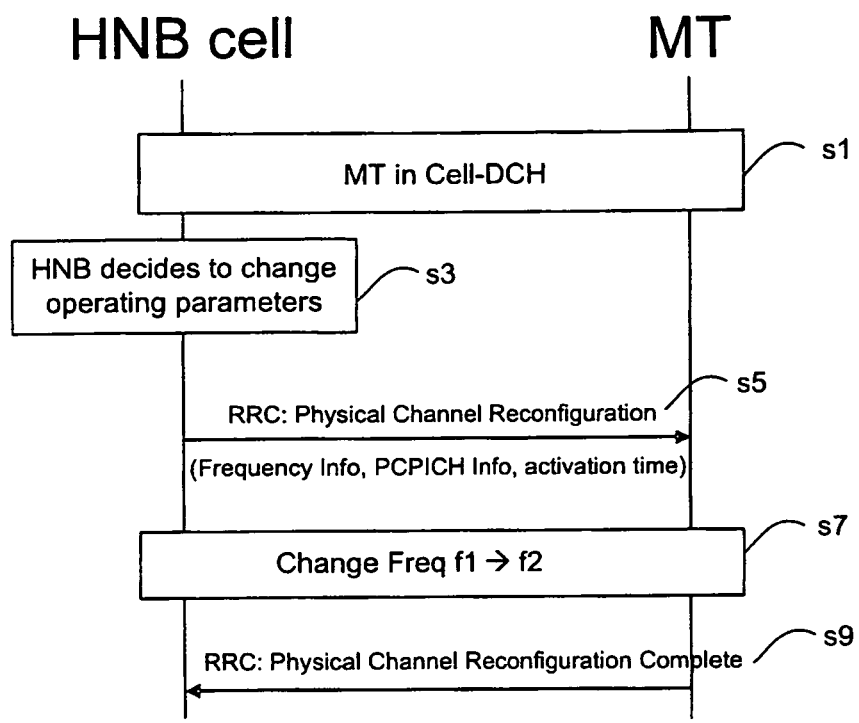
FIG. 4 is a timing diagram illustrating a procedure to inform mobile telephones in the HNB's cell of the change to the HNB's operating radio parameters.

When the mobile telephone 3 is in either the Cell-DCH or Cell-FACH mode, various techniques can be used to inform the mobile telephone 3 of the new radio parameters. However, one of the simplest techniques is to reuse the existing inter frequency handover RRC procedure illustrated in FIG. 4 (which is used when the mobile telephone 3 moves between cells or RAN base stations 5). As shown, at step s1, the HNB 11 is serving a mobile telephone 3 in the Cell-DCH mode. At step s3 the HNB 11 decides to change its operating radio parameters and in step s5 the HNB 11 sends an RRC reconfiguration message to the mobile telephone 3 with an activation time, over a control channel dedicated to the mobile telephone 3. A change in the frequency can be indicated using the existing "frequency Info" Information Element (IE); and a change in the PSC can be indicated using the existing "Primary CPICH Info" Information Element. The activation time effectively defines a delay before the changeover will take place and can be defined by a Connection Frame number (CFN). The CFN is a counter maintained by both the HNB 11 and the mobile telephone 3 that counts from 0 to 255 and is incremented every 10 ms. Therefore specifying a CFN value identifies to the mobile telephone 3 a time point when the changeover will take place. At step s7 the HNB 11 and the mobile telephone 3 change the radio parameters (in this case the frequency from f1 to f2) at the activation time. Once the mobile telephone 3 has completed the reconfiguration, it sends, in step s9, an RRC reconfiguration message confirming that the change has been completed.

Option 2—all Modes Except Cell-DCH

Figure 5:
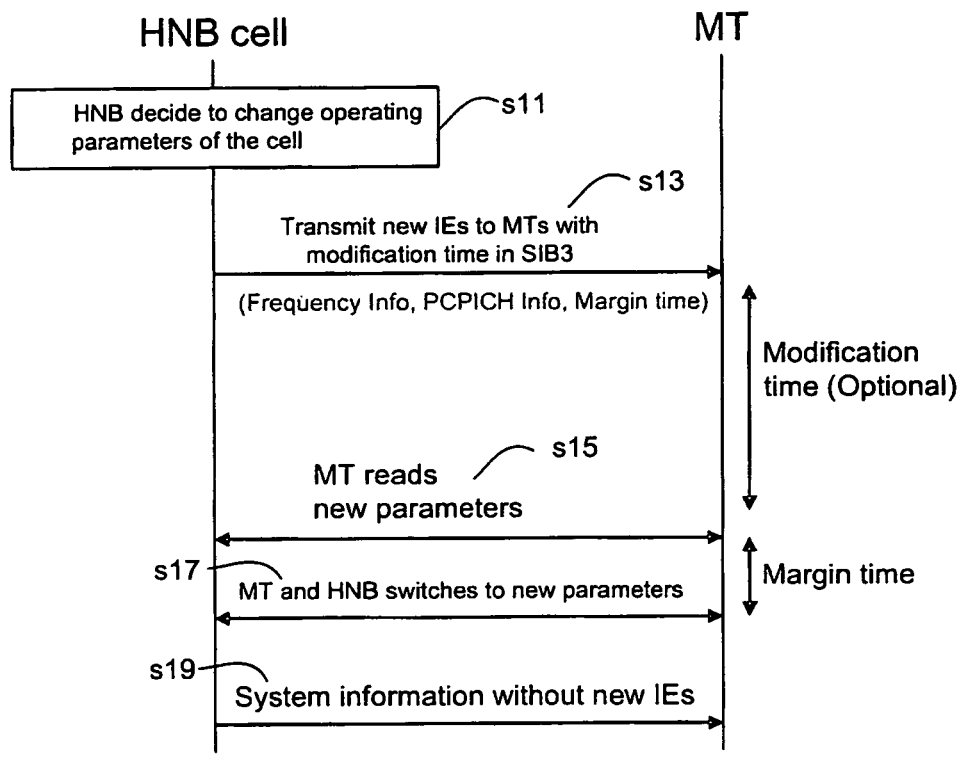
FIG. 5 is a timing diagram illustrating another procedure to inform mobile telephones in the HNB's cell of the change to the HNB's operating radio parameters.

Another option is to include the new operating radio parameters in the System Information Block (SIB) type 3, using three new Information Elements (IEs), which is broadcast over the broadcast control channel (BCCH). The three new IEs would provide the new Frequency Information; Primary CPICH Information; and a Margin time. The procedure for synchronising the changeover in this case is illustrated in FIG. 5. In step s11, the HNB 11 decides to change the operating radio parameters of the cell based on the trigger. In step s13, the HNB 11 sends the mobile telephone 3 a system information change indication (BCCH Modification Info) and the SIB 3 including the new parameters over the broadcast control channel (BCCH). The BCCH Modification Info tells the mobile telephone 3 what information to look at in the SIB 3. Typically the HNB 11 will repeat the transmission of the BCCH Modification Info and the SIB 3 a number of times to ensure that the mobile telephone 3 is able to receive the modification information before the changeover. In step s15 the mobile telephone 3 reads the new operating parameters from the SIB when it is received or after an optional Modification time defined by the SIB. In step s17 the mobile telephone 3 and the HNB 11 change the operating radio parameters at a Margin time defined in the SIB. The defined Margin time will be chosen to give sufficient time for the synthesiser that forms part of the transceiver circuitry 23, to change the operating frequency and to start operating on the new frequency after expiry of the Margin time. The HNB 11 will then stop broadcasting, in step s19, the new parameters after expiry of Margin time.

The Margin time therefore provides a synchronised way of changing the operating parameters. The Margin time may be specified using a System Frame Number (SFN). The SFN is a counter that is maintained by both the HNB 11 and the mobile telephone 3 and that is also incremented every 10 ms. However, the SFN counter counts between 0 and 4095. The SFN is used to define the Margin time due to the longer time required to perform the procedure illustrated in FIG. 5. Where the HNB 11 uses both options 1 and 2 to inform mobile telephones of the change, it will set the Activation time and the Margin time in order to ensure that the mobile telephones 3 operating in the different modes perform the switchover at the same time.

Option 3—all Modes Except Cell-DCH

Another way that the HNB 11 can inform mobile telephones 3 of the new operating parameters, is to change the Neighbour Cell List (NCL). More specifically, one of the routine tasks performed by the HNB 11 is to inform mobile telephones 3 that it is serving of neighbouring cells. It does this so that the mobile telephone 3 can handover to one of those neighbouring cells when, for example, the mobile telephone 3 moves out of range of the HNB 11. This information is transmitted in SIB 11 or SIB 12 over the Broadcast Control Channel (BCCH). Thus, when a PSC and/or frequency change is triggered, the HNB 11 includes in the broadcast neighbour cell list (SIB 11/12) itself as a neighbour with the new configuration (it can also configure the Cell Individual Offset (CIO) parameter so that the ranking of the cells in the NCL that will be performed by the mobile telephone 3 will favour the new cell over the other neighbours). Depending on the change to the operating radio parameters, this may involve changing the Intra frequency measurement system information IE and/or the Inter-frequency measurement system information IE in Measurement control system information of SIB type 11 or 12. For example, if the HNB 11 is changing frequency, then it would change the Inter-frequency measurement system information IE, but if it is keeping the same frequency and changing only its primary scrambling code (PSC), then the HNB 11 would change the Intra-frequency measurement system information IE.

The mobile telephone 3 maintains a list of neighbouring cells and upon receiving the information about the new cell, it adds it to the stored list. When the reconfiguration of the HNB 11 is performed, the mobile telephone 3 will lose contact with the HNB 11 and will start the reselection procedure to find a new cell. This reselection procedure uses the Neighbour Cell List and the CIO parameters for the cells in the NCL to identify a new cell with which to register. As a result of the changes made to the NCL by the HNB 11 immediately prior to its reconfiguration, the mobile telephone 3 should quickly reselect the HNB 11 on its new configuration.

Advantages

The embodiments described above offer a number of important advantages over existing HNBs, which can only be reconfigured at power up and hence would require a reboot if changes were desired. The advantages include:

The end user will not notice any change in the operating parameters of the HNB and can expect reliable and seamless service even when normal service is ongoing. This will also mean that the user will remain connected to the HNB and will not switch cell to another cell where less favourable rates may apply.

In the prior art, the HNB would always be reset or rebooted to change its operating parameters, which leads to disruption of ongoing services in connected mode which in turn leads to a bad user experience.

There is no need to send a service engineer to perform the change during the night, as is currently done for macro cells.

Modifications and Alternatives

A detailed embodiment has been described above. As those skilled in the art will appreciate, a number of modifications and alternatives can be made to the above embodiment whilst still benefiting from the inventions embodied therein.

In the above embodiment, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the embodiment described above, the mobile telephone and the HNB each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the HNB or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

Various other modifications will be apparent to those skilled in the art and will not be described in further detail here.

This application is based upon and claims the benefit or priority from United Kingdom Patent Application No. 0902628.7, filed on Feb. 17, 2009, the disclosure of which is incorporated herein in its entirety by reference.

The invention claimed is:

1. A home base station comprising:
an interface for interfacing with an operator network via a public network;
transceiver circuitry operable to transmit wireless signals to and to receive wireless signals from a mobile user device in accordance with current operating radio parameters;
a communications control module operable to control communications between the home base station and said mobile user device using said transceiver circuitry; and
a parameter control module operable, in response to a trigger, to obtain new operating radio parameters and to reconfigure the transceiver circuitry with the new operating radio parameters,
wherein the new operating radio parameters include one or more of: a new frequency and a new primary scrambling code (PSC),
wherein said communications control module is operable to communicate with said mobile user device to inform the mobile user device of the new operating radio parameters,
wherein said communications control module is operable to inform mobile user devices operating in a Connected mode or an Idle mode of a change,
wherein said communications control module is operable to inform mobile user devices by broadcasting data relating to the change over a broadcast channel, and
wherein said communications control module is operable to broadcast an update for a Neighbor Cell List, identifying a cell of the home base station as a neighbor with a new configuration.

2. The home base station according to claim 1, wherein said communications control module is operable to communicate with said mobile user device to inform the mobile user device of the new operating radio parameters prior to said parameter control module reconfiguring said transceiver circuitry.

3. The home base station according to claim 1, wherein said communications control module is operable to inform mobile user devices operating in the Connected mode of the change, but not mobile user devices operating in the Idle mode.

4. The home base station according to claim 1, wherein said communications control module is operable to broadcast a System Information Block comprising Information Elements identifying the change.

5. The home base station according to claim 3, wherein said communications control module is operable to inform a mobile user device operating in a cell-DCH or a Cell-FACH mode over a control channel dedicated to the user device.

6. The home base station according to claim 5, wherein said communications control module is operable to inform mobile user devices operating in cell-DCH and Cell-FACH modes using an inter-frequency Radio Resources Control, RRC, handover procedure.

7. The home base station according to claim 3, wherein the communications control module is operable to inform said Connected mode mobile user devices and said Idle mode mobile user devices using different control channels.

8. The home base station according to claim 7, wherein said communications control module is operable to inform said Connected mode mobile user devices and said Idle mode mobile user devices when the change will take place.

9. A mobile user device comprising:
transceiver circuitry for transmitting signals to and for receiving signals from a home base station in accordance with current operating radio parameters of the home base station;
a communications control module operable to control communications between the mobile user device and the home base station; and
a parameter control module operable to obtain data identifying new operating radio parameters of the home base station and to reconfigure said transceiver circuitry with the new operating radio parameters,
wherein the new operating radio parameters include one or more of: a new frequency and a new primary scrambling code (PSC),
wherein said communications control module is operable to inform mobile user devices operating in a Connected mode or an Idle mode of a change,
wherein said communications control module is operable to inform mobile user devices by broadcasting data relating to the change over a broadcast channel, and wherein said communications control module is operable to broadcast an update for a Neighbor Cell List, identifying a cell of the home base station as a neighbor with a new configuration.

10. The mobile user device according to claim 9, wherein said communications control module is operable to receive the new operating radio parameters from the home base station.

11. The mobile user device according to claim 10, having a first mode of operation and a second mode of operation,
wherein said communications control module is operable to receive the new operating radio parameters over a dedicated control channel when the mobile user device is operating in said first mode of operation and is operable to receive the new operating radio parameters over a broadcast channel when the mobile user device is operating in said second mode of operation.

12. The mobile user device according to claim 11, wherein said first mode of operation comprises a Connected mode of operation.

13. The mobile user device according to claim 12, wherein said communications control module is operable to receive the new operating radio parameters from the home base station using an inter-frequency Radio Resources Control, RRC, handover procedure.

14. The mobile user device according to claim 10, wherein said second mode of operation comprises an Idle mode of operation.

15. The mobile user device according to claim 10, wherein said communications control module is operable to receive a broadcast System Information Block having Information Elements identifying the change.

16. The mobile user device according to claim 10, wherein said communications control module is operable to receive timing information and wherein said parameter control module is operable to reconfigure the transceiver circuitry at a time determined using the received timing information.

17. The mobile user device according to claim 16, operable to continue communicating with the home base station using the current operating radio parameters in an interval between receiving the new operating radio parameters and reconfiguring the transceiver circuitry.

18. A method of operating a home base station, said method comprising:
using transceiver circuitry to transmit wireless signals to and to receive wireless signals from a mobile user device in accordance with current operating parameters;
receiving a trigger to change the current operating parameters;
obtaining new operating radio parameters in response to the trigger;
informing the mobile user device of the new operating radio parameters, the new operating radio parameters including one or more of: a new frequency and a new primary scrambling code (PSC); and
reconfiguring the transceiver circuitry with the new operating radio parameters,
wherein said informing informs mobile user devices operating in a Connected mode or an Idle mode of the change,
wherein said informing informs mobile user devices by broadcasting data relating to the change over a broadcast channel, and
wherein said broadcasting broadcasts an update for a Neighbor Cell List, identifying a cell of the home base station as a Neighbor with a new configuration.

19. The method according to claim 18, wherein said informing the mobile user device of the new operating radio parameters is performed prior to said reconfiguring the transceiver circuitry.

20. The method according to claim 18, wherein said informing informs mobile user devices operating in the Connected mode of the change, but not mobile user devices operating in the Idle mode.

21. The method according to claim 18, wherein said broadcasting broadcasts a System Information Block having Information Elements identifying the change.

22. The method according to claim 20, wherein said informing informs a mobile user device operating in a cell-DCH or a Cell-FACH mode over a control channel dedicated to the mobile user device.

23. The method according to claim 22, wherein said informing informs mobile user devices operating in cell-DCH and Cell-FACH modes using an inter-frequency Radio Resources Control, RRC, handover procedure.

24. The method according to claim 20, wherein said informing informs said Connected mode mobile user devices and said Idle mode mobile user devices using different control channels.

25. The method according to claim 24, wherein said informing informs said Connected mode mobile user devices and said Idle mode mobile user devices when the change will take place.

26. A method performed by a mobile user device, said method comprising:
using transceiver circuitry to transmit signals to and to receive signals from a home base station in accordance with current operating parameters;
obtaining data identifying new operating radio parameters of the home base station, the new operating radio parameters including one or more of: a new frequency and a new primary scrambling code (PSC);
broadcasting an update for a Neighbor Cell List, identifying a cell of the home base station as a Neighbor with a new configuration and
reconfiguring said transceiver circuitry with the new operating radio parameters,
wherein said obtaining data includes data of mobile user devices operating in a Connected mode or an Idle mode of a change, and
wherein said obtaining data includes data of mobile user devices by broadcasting data relating to the change over a broadcast channel.

27. The method according to claim 26, further comprising receiving the new operating radio parameters from the home base station.

28. The method according to claim 27, wherein the mobile user device has a first mode of operation and a second mode of operation and wherein said receiving receives the new operating radio parameters over a dedicated control channel when the mobile user device is operating in said first mode of operation and receives the new operating radio parameters over a broadcast channel when the mobile user device is operating in said second mode of operation.

29. The method according to claim 28, wherein said first mode of operation comprises a Connected mode of operation.

30. The method according to claim 29, wherein said receiving receives the new operating radio parameters from the home base station using an inter-frequency Radio Resources Control, RRC, handover procedure.

31. The method according to claim 28, wherein said second mode of operation comprises an Idle mode of operation.

32. The method according to claim 28, wherein said receiving receives a broadcast System Information Block having Information Elements identifying the change.

33. The method according to claim 27, wherein said receiving receives timing information and wherein said reconfiguring is performed at a time determined using the received timing information.

34. The method according to claim 33, further comprising continuing to communicate with the home base station using the current operating radio parameters in an interval between receiving the new operating radio parameters and reconfiguring the transceiver circuitry.

35. A computer implementable instructions product comprising computer implementable instructions for causing a programmable communications device to become configured as a home base station comprising:
- an interface for interfacing with an operator network via a public network;
- transceiver circuitry operable to transmit wireless signals to and to receive wireless signals from a mobile user device in accordance with current operating radio parameters;
- a communications control module operable to control communications between the home base station and said mobile user device using said transceiver circuitry; and
- a parameter control module operable, in response to a trigger, to obtain new operating radio parameters and to reconfigure the transceiver circuitry with the new operating radio parameters,
- wherein the new operating radio parameters include one or more of: a new frequency and a new primary scrambling code (PSC), and
- wherein said communications control module is operable to communicate with said mobile user device to inform the mobile user device of the new operating radio parameters,
- wherein said communications control module is operable to inform mobile user devices operating in a Connected mode or an Idle mode of a change,
- wherein said communications control module is operable to inform mobile user devices by broadcasting data relating to the change over a broadcast channel, and
- wherein said communications control module is operable to broadcast an update for a Neighbor Cell List, identifying a cell of the home base station as a neighbor with a new configuration.

* * * * *